United States Patent [19]
Johansson

[11] 3,951,311
[45] Apr. 20, 1976

[54] LIQUID MEASURING AND MIXING APPARATUS

[75] Inventor: Bjorn-Olow Johansson, Lomma, Sweden

[73] Assignee: Alfa-Laval AB, Tumba, Sweden

[22] Filed: Jan. 12, 1973

[21] Appl. No.: 323,219

[30] Foreign Application Priority Data
Jan. 19, 1972 Sweden.................................. 576/72

[52] U.S. Cl.................................... 222/145; 138/31
[51] Int. Cl.$^2$........................................... B67D 5/06
[58] Field of Search ................. 222/52, 55, 57, 132, 222/134, 135, 145; 138/30, 31

[56] References Cited
UNITED STATES PATENTS

| | | | |
|---|---|---|---|
| 2,764,999 | 10/1956 | Stanbury............................... | 138/31 |
| 2,828,769 | 4/1958 | Cooper.................................. | 138/30 |
| 3,224,642 | 12/1965 | De Martelaere et al............ | 222/134 |

Primary Examiner—Robert B. Reeves
Assistant Examiner—Joseph J. Rolla
Attorney, Agent, or Firm—Cyrus S. Hapgood

[57] ABSTRACT

Inlet conduits supply different liquids under pressure to a measuring unit which delivers measured quantities of the respective liquids to a common outlet conduit for the desired liquid mixture. To counteract variations in the flow rate of the mixture in the outlet conduit due to operation of the measuring unit, the inlet conduit for one of the liquids and the outlet conduit for the liquid mixture are connected to respective chambers containing a movable dividing member subjected to opposing pressures in the two chambers. When the flow rate decreases in the outlet conduit, the resulting pressure drop in the outlet chamber connected to this conduit causes the constant pressure in the other chamber to move the dividing member into the outlet chamber and thereby expel liquid mixture therefrom so as to compensate for the decreased flow rate in the outlet conduit.

3 Claims, 1 Drawing Figure

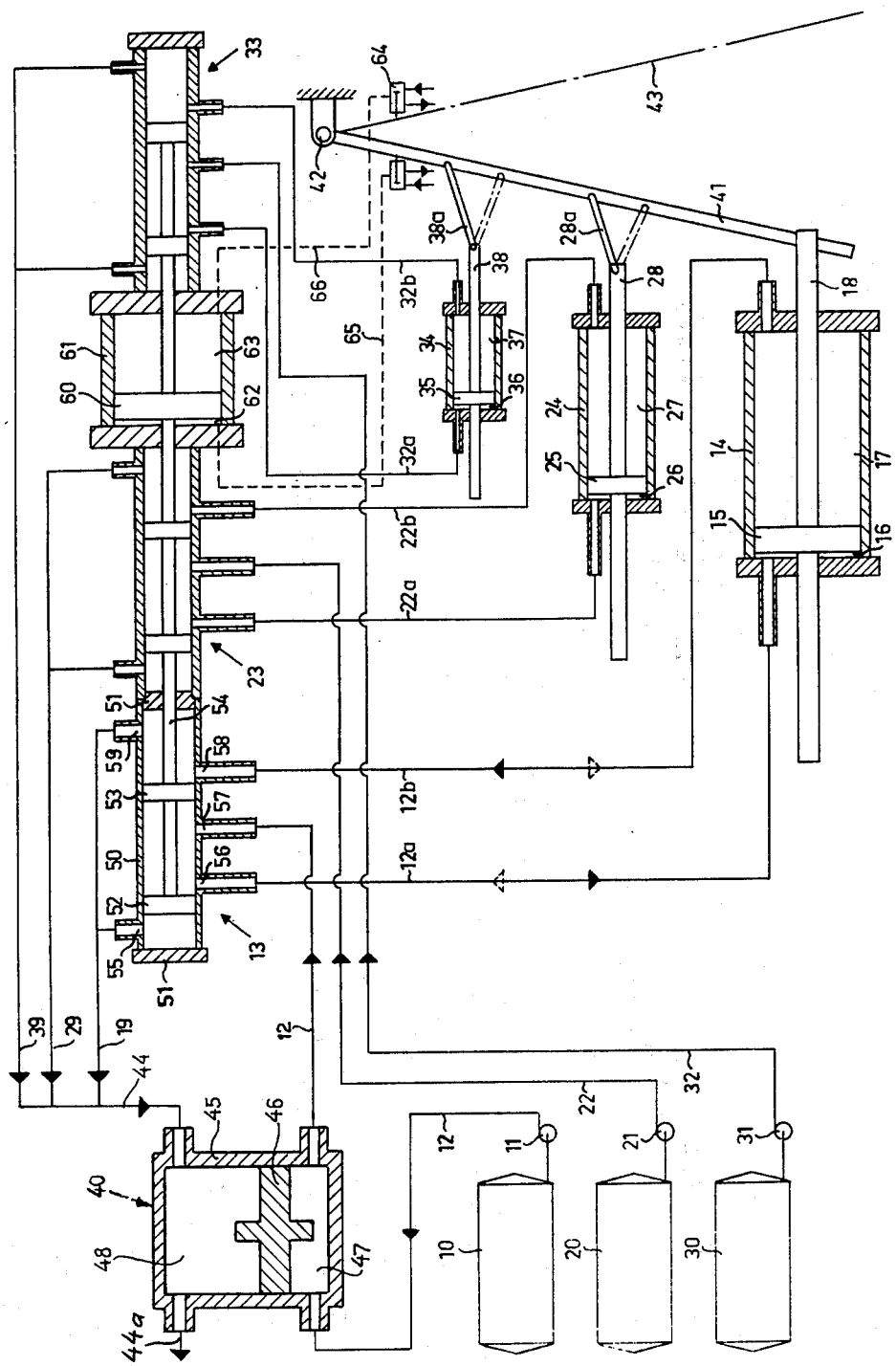

LIQUID MEASURING AND MIXING APPARATUS

The present invention relates to apparatus for metering and mixing different kinds of liquids and which is of the type comprising a metering unit having inlet conduits for supplying the respective liquids under pressure, and outlet conduits which are connected to a common outlet conduit for the liquid mixture.

In a prior apparatus of this type, a varying flow occurs in the common outlet conduit for the liquid mixture, due to the fact that the different mixture components are metered intermittently by means of pistons movable within cylinders. An apparatus of this kind is disclosed, for example, in Swedish Patent No. 325,720 and French Patent No. 1,595,934.

The varying flow rate of the mixture in the outlet conduit of such an apparatus is often a problem. In order that the outlet conduit may be connected directly to a plant in which a continuous process is to be performed, it is desired that the liquid flow in said outlet conduit be maintained at a substantially constant rate.

Arrangements have been previously proposed for equalizing a liquid flow in a process conduit, as disclosed, for example, in U.S. Pat. No. 2,828,769. However, an arrangement of this kind, comprising bellows, is not suitable for automatically performed cleaning operations. There are also prior arrangements having, instead of bellows, a piston movable within a cylinder, as a pressure transferring member; but these arrangements are also unsuitable, as the interspace between the piston and the cylinder wall can never be entirely sealed. Small quantities of the used pressure fluid will thus come into contact with the process liquid, which is not acceptable.

The principal object of the present invention is to provide a flow equalizing arrangement for metering and mixing apparatus of the type first described, which arrangement fulfills high aseptic requirements and also is suitable for automatically performed cleaning operations.

This object is achieved according to the invention by an arrangement wherein the inlet conduit for one of the components, which is to be included in the liquid mixture, and the outlet conduit for the liquid mixture communicate with respective chambers, and a member subjected to the pressure in the two chambers is movable therein so that it enters the outlet chamber to displace liquid therefrom when the pressure is lowered in the outlet conduit, this member being forced into the outlet chamber by the pressure in the inlet conduit for said component.

When the flow of liquid mixture from the metering and mixing apparatus decreases or even ceases entirely, the pressure in the aforesaid outlet chamber is lowered. This creates a difference between the pressure forces acting on the pressure transmitting member in the two chambers, so that this member moves into the outlet chamber and thereby acts to restore the normal flow from this chamber and thence through the outlet conduit. Thus, the flow rate through the outlet conduit may be kept substantially unchanged, even if the liquid flow from the metering and mixing apparatus occasionally decreases or ceases entirely. As soon as the metering and mixing apparatus again provides a larger liquid flow to the outlet conduit, the pressure in the outlet chamber increases so that the pressure transmitting member, influenced by this higher pressure, returns to its original position. Consequently, according to the invention the pressure in one of the inlet conduits of the metering and mixing apparatus is used for maintaining a substantially even flow of liquid mixture in the outlet conduit of the apparatus.

The effective pressure area of the pressure transmitting member need not necessarily have the same size in both chambers. The movements of this member depend upon not only the size of these areas but also the pressures prevailing in the chambers.

The invention thus provides a flow equalizing arrangement, in connection with a metering and mixing apparatus, which is satisfactory from the cleaning point of view. More particularly, when the apparatus is rinsed through with cleaning liquid, the flow equalizing means is also cleaned automatically, and then not only the part of it which normally is passed through by the liquid mixtue but also the part which is passed through by pressure fluid, i.e., in this case by the said mixture component. Further, the invention makes it possible to use a piston, movable in a cylinder, as a pressure transmitting member instead of bellows of the kind disclosed in said U.S. Pat. No. 2,828,769, due to the fact that it is no longer necessary to provide complete sealing between the process liquid and the pressure fluid. That is, it does not matter if the liquid mixture comes into contact with fractions of the said mixture component.

In a preferred embodiment of the invention, the aforementioned two chambers are arranged to be pressed through by the liquid mixture and the said mixture component, respectively, so that a better renewal of fluid in the chambers is achieved. The inlet conduit for each of the chambers may open tangentially therein, so that a circulating liquid movement is obtained in the chambers.

The invention is described in more detail below with reference to the accompanying drawing, in which the single illustration is a schematic view of an example of a system comprising an apparatus for metering and mixing different liquids, and means according to the invention connected to this apparatus.

In the drawing there are shown three containers 10, 20 and 30 containing different liquids to be mixed in predetermined quantities. The final mixture passes through a flow equalizing means 40 before leaving the system shown in the drawing.

From the containers 10, 20 and 30, the three different liquids are pumped by means of centrifugal pumps 11, 21 and 31 through conduits 12, 22 and 32 to reversing valves 13, 23 and 33, respectively. The liquid in the conduit 12 passes to the reversing valve 13 by way of the flow equalizing means 40, for a reason to be described later. Each liquid is directed by the corresponding reversing valve through one of two conduits 12a, 12b; 22a, 22b; and 32a, 32b, respectively, to a measuring cylinder 14, 24 and 34, respectively. In each of the measuring cylinders is an axially reciprocating piston 15, 25 and 35, respectively, which defines within the cylinder two separated chambers 16, 17; 26, 27 and 36, 37, respectively. The chambers 16, 26 and 36 communicate with the conduits 12a, 22a and 32a, respectively, while the other chambers 17, 27 and 37 communicate with the conduits 12b, 22b and 32b, respectively.

All of the pistons 15, 25 and 35 are coupled by means of piston rods 18, 28 and 38 to a common rod 41 which is suspended from and turnable around a fixed point 42. In the drawing, the rod 41 is shown in one of its end positions, the other end position being illustrated by a broken line 43. The piston rods 28 and 38 are coupled to the common rod 41 by means of pivoted levers 28a and 38a, respectively, which are connected to rod 41 at different points situated at different distances from the fixed point 42. By the above described arrangement, the pistons 15, 25 and 35 are positively interconnected so that every movement of one piston, for instance piston 15, results in a predetermined movement of each of the other pistons 25 and 35.

The reversing valves 13, 23 and 33 are arranged to connect the two chambers in the respective measuring cylinders 14, 24 and 34 alternately with the inlets and outlets of the measuring unit for the different liquids. The inlets for the liquid are represented in the drawing by the conduits 12, 22 and 32 coming from the containers 10, 20 and 30, while the outlets are represented by conduits 19, 29 and 39 opening into a common outlet conduit 44. As all of the three reversing valves 13, 23 and 33 are constructed in the same way, only one of them, reversing valve 13, will be described in detail below. Only this reversing valve 13 is provided with reference numerals in the drawing.

The reversing valve 13 comprises a valve housing consisting of a cylindrical sleeve 50, provided at opposite ends with end walls 51, and an axially reciprocable valve body which consists of two pistons 52 and 53 interconnected by means of a piston rod 54. The valve housing has five axially separated openings 55, 56, 57, 58 and 59 of which the middle opening 57 communicates with the inlet conduit 12, the two outer openings 55 and 59 communicate with the outlet conduit 19, and the two remaining openings 56 and 58 communicate with the conduits 12a and 12b, respectively, leading to the measuring cylinder 14. The pistons 52 and 53 of the valve body are so arranged relative to each other, and to the five openings in the valve housing, that in one end positon of the valve body (shown in the drawing) they connect the inlet conduit 12 with the conduit 12a while connecting the conduit 12b with the outlet conduit 19; and in the other end position of the valve body they connect the inlet conduit 12 with the conduit 12b while connecting the conduit 12a with the outlet conduit 19. The reversing valve is thus constructed so that the two chambers 16 and 17 of the measuring cylinder 14 may be connected alternately with the inlet conduit 12 and the outlet conduit 19.

As can be seen from the drawing, the piston rod 54 is common to all of the three reversing valves 13, 23 and 33, so that the valves can be reversed simultaneously. For the reversing operation, the piston rod 54 is secured to a somewhat larger piston 60 which is confined and axially movable within a separate cylinder 61, defining therein two pressure chambers 62 and 63. A valve means 64 is arranged to be actuated by the above-described rod 41 to connect the chambers 62 and 63 alternately to a source of pressurized fluid (not shown). Conduits for the pressurized fluid are illustrated by dotted lines 65 and 66.

In the operation of the above-described apparatus, the centrifugal pumps 11, 21 and 31 pump liquids from the containers 10, 20 and 30 through the conduits 12, 22 and 32 to the reversing valves 13, 23 and 33. These valves in the drawing are in a position such that the liquids will be directed to the chambers 16, 26 and 36 of the measuring cylinders via the conduits 12a, 22a and 32a. The pressure of the liquids drives the pistons 15, 25 and 35 to the right from the end positions shown in the drawing to the other end positions, whereby liquids contained in the chambers 17, 27 and 37 are forced out through the conduits 12b, 22b and 32b and leave the apparatus through the valves 13, 23 and 33 and the outlet conduits 19, 29 and 39. Since the pistons 15, 25 and 35 of the measuring cylinders are interconnected as described above, the coupled movement of these pistons causes accurately measured proportions of the various liquids to leave the apparatus.

When the rod 41 reaches its end position illustrated by the broken line 43, the valve means 64 is actuated so that the chamber 62 is put in communication with the pressure fluid source (not shown), the chamber 63 then being emptied of fluid. The piston rod 54, common to all of the reversing valves, will then be moved to the right, as seen in the drawing, to its other end position. All of the valve pistons 52 and 53 are thereby moved to the right and will be positioned between the valve housing openings 56 and 57, and 58 and 59, respectively. This means that the inlet conduits 12, 22 and 32 are now put in communication with the chambers 17, 27 and 37, respectively, through the valve housing openings 57 and 58, while the chambers 16, 26 and 36 are put in communication with the outlet conduits 19, 29 and 39, respectively, through the valve housing openings 56 and 55. The pistons 15, 25 and 35 of the measuring cylinders will thus be forced to the left, as seen in the drawing, and back to their illustrated end positions so that liquids previously pumped into the chambers 16, 26 and 36 will now leave these chambers and be directed to the flow equalizing means 40 through the conduits 12a, 22a and 32a, the reversing valves 13, 23 and 33, the outlet conduits 19, 29 and 39, and the common outlet conduit 44.

When the rod 41 reaches the end position shown in the drawing, the valve means 64 is actuated again so as to return piston 60 and valve pistons 52–53 to their illustrated left-hand positions, after which the above-described operation is repeated.

In the outlet conduit 44 for liquid mixture there will be variations in the flow rate, due to the construction of the measuring apparatus. The mixing of the different liquids is obtained by leading the measured quantities of the liquids together into the outlet conduit 44. To counteract these variations in the flow from the measuring and mixing apparatus, the liquid mixture passes through the equalizing means 40. This comprises a cylinder 45, the interior of which is divided by a piston 46 into two chambers 47 and 48. The outlet conduit 44 is connected to the cylinder 45 so that liquid mixture leaving the measuring and mixing apparatus passes through the chamber 48. The inlet conduit 12 for one of the liquids to be mixed is connected to the cylinder 45 so that the liquid in the conduit 12 passes through the other chamber 47. The pump 11 is arranged to maintain constantly a certain pressure in the inlet conduit 12. This pressure is controlled so that it is lower than the pressure prevailing in the outlet conduit 44 when the measuring and mixing apparatus provides a maximum flow. At this moment the piston 46 will be subjected to a higher pressure on its side facing the chamber 48 than on its side facing the chamber 47. It will thus take a position in the lower part of the cylinder 45, as seen in the drawing. The liquid mixture now leaves the equalizing means 40 at a certain flow rate.

When the flow of liquid mixtue from the measuring and mixing apparatus periodically decreases, or ceases entirely, the pressure in the outlet conduit 44 and thus in the chamber 48 is lowered. The piston 46 is then forced upward by the pressure in the chamber 47, so that liquid mixture is expelled from the chamber 48 and through the mixture outlet 44a of the equalizer at a higher flow rate than would otherwise be the case. The decrease of the liquid flow from the measuring and mixing apparatus is substantially compensated in this way by the auxiliary flow of liquid mixture which leaves the chamber 48 due to the upward movement of the piston 46. The liquid mixture will thus leave the system at a substantially constant flow rate, even if the flow from the measuring and mixing apparatus during limited periods of time decreases or ceases entirely.

When maximum flow is provided by the measuring and mixing apparatus, the pressure in the chamber 48 is increased so that the piston 46 is returned to the position shown in the drawing.

Of course, the cylinder 45 is dimensioned according to the requirements of compensation for the periodic decreases of the flow rate from the measuring and mixing apparatus.

I claim:

1. In an apparatus for measuring and mixing different liquids and comprising a measuring unit having inlet conduits for supplying the respective liquids under pressure, said unit also having outlet ducts for discharging measured quantities of the respective liquids and a common outlet conduit connected to said ducts for discharging a mixture of the measured liquid quantities, and means forming an inlet chamber connected to one of said inlet conduits for a liquid component of the mixture and forming a separate outlet chamber connected to said outlet conduit for the mixture, said means including a member subjected to the pressures in said two chambers and movable by the pressure in said one inlet conduit into said outlet chamber in response to a pressure drop in the outlet chamber, whereby said member acts to displace liquid from said outlet chamber.

2. Apparatus according to claim 1, in which said means comprise a cylinder, said member being a piston floating in the cylinder and dividing the interior thereof into said two chambers.

3. Apparatus according to claim 1, in which said one inlet conduit and said outlet conduit are connected to the respective chambers to provide for flow of said liquid component and said liquid mixture through the inlet chamber and the outlet chamber, respectively.

* * * * *